Dec. 22, 1964
U. E. VOETTER
3,162,806
BORE LOGGING APPARATUS INCLUDING CONDUCTIVE
HOUSINGS, MECHANICALLY COUPLED BY AN
ELECTRICALLY INSULATING
BINDING AGENT
Filed Aug. 31, 1959
2 Sheets-Sheet 1
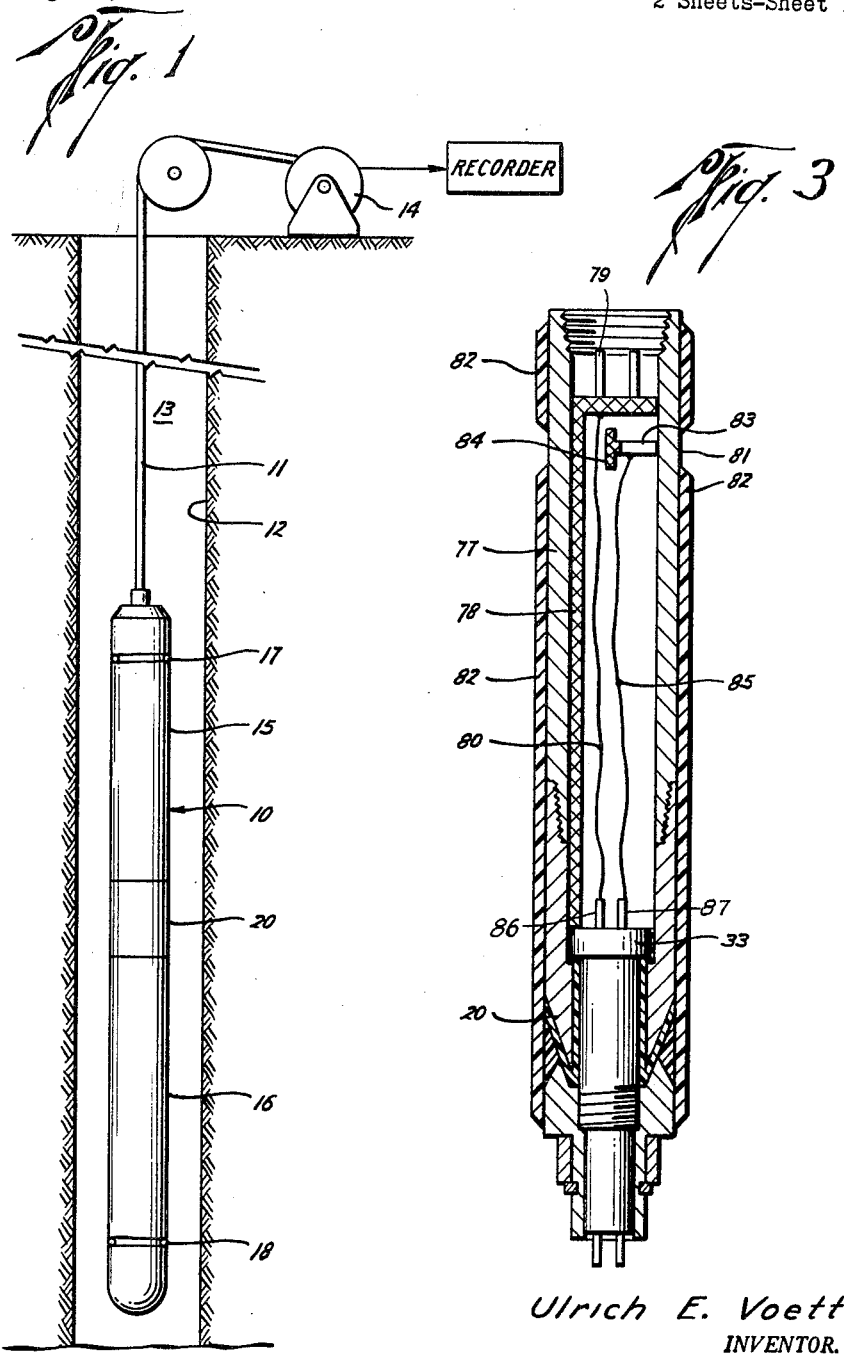
Ulrich E. Voetter
INVENTOR.
BY Donald H. Fidler
ATTORNEY

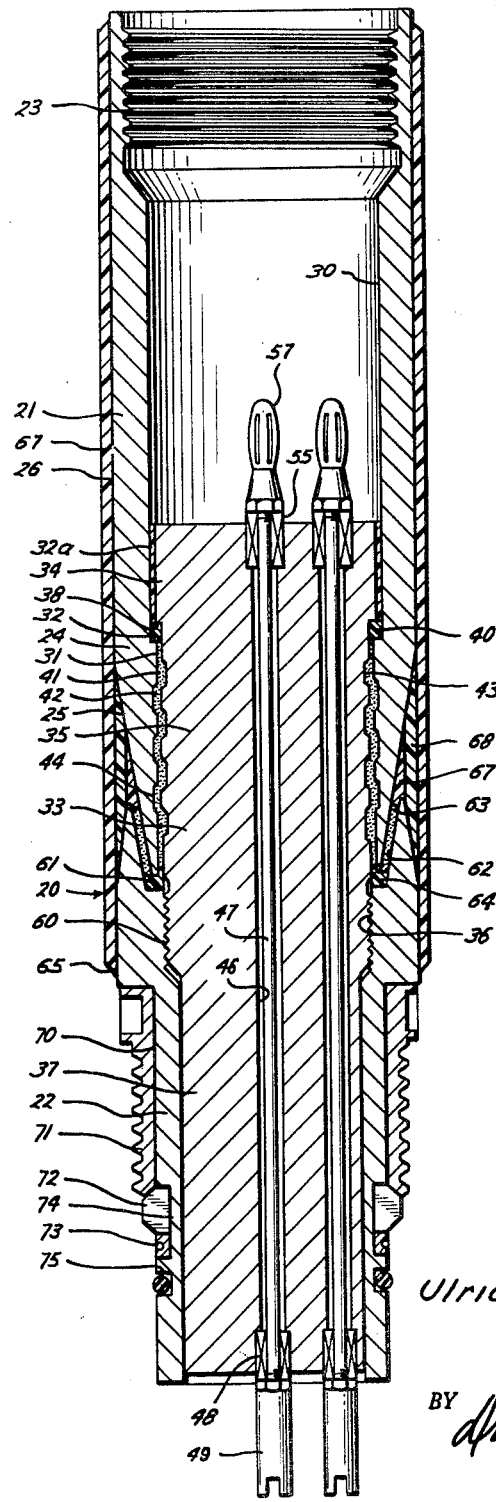

United States Patent Office 3,162,806
Patented Dec. 22, 1964

3,162,806
BORE LOGGING APPARATUS INCLUDING CONDUCTIVE HOUSINGS, MECHANICALLY COUPLED BY AN ELECTRICALLY INSULATING BINDING AGENT
Ulrich E. Voetter, Houston, Tex., assignor to Schlumberger Well Surveying Corporation, Houston, Tex., a corporation of Texas
Filed Aug. 31, 1959, Ser. No. 837,166
12 Claims. (Cl. 324—10)

This invention relates to borehole logging apparatus and more particularly to borehole apparatus in which electrically conductive housing sections are insulated from one another.

Conventional electrical logging apparatus generally employs electrodes from which currents are sent and at which potentials are measured in boreholes containing conductive fluids. In so-called "normal" devices, a "point" current electrode A is spaced from "point" electrodes M and N and the resistivity of the surrounding medium is determined by a well-known relationship between the potential difference between electrodes M and N, the current and a coefficient which depends upon the spacings between the electrodes. In so-called "lateral" devices, current is passed between a pair of spaced electrodes A and B in a borehole and the potential difference between spaced electrodes M and N is measured, the spacing of electrodes A and B being small as compared to their spacing from electrode M.

In present day practice, it is common to have apparatus which includes a short-normal device (AM spacing equal to 16" to 18"), a long-normal device (AM spacing equal to 64"), and a long lateral device (AO spacing equal to 18'8" where O is the midpoint between the electrodes A and B) for obtaining three resistivity logs. One or more of these resistivity tools may be combined with other exploratory tools such as, for example, an induction logging tool.

There are many complications which may arise with a combination of these tools, one of which has been the interconnection of conductive housings intermediate the current and measuring electrodes which presents a low impedance current path and, hence, affects the current distribution into adjacent formation media in a borehole and the potentials at the measuring electrodes. While it would seem a simple thing to electrically insulate the conductive housings from one another, such is not the case because an insulated coupling to withstand the large forces, high pressures and temperatures normally encountered in borehole use has not heretofore been successfully realized.

It is accordingly an object of the present invention to provide borehole apparatus in which electrically conductive housings are insulated from one another.

Another object of the present invention is to provide means for coupling while electrically insulating a pair of conductive housings.

Apparatus in accordance with the present invention includes upper and lower conductive housings for electrical measuring devices, the conductive housings being coupled together by an intermediate insulating housing. The insulating housing has concentrically arranged members secured to the respective conductive housings and spaced and secured rigidly relative to one another by a material which is electrically nonconductive, thereby insulating and securing the conductive housings with respect to one another.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIG. 1 is an illustration of apparatus embodying the present invention disposed in a borehole;

FIG. 2 is a cross-sectional view of an insulated coupling embodying the present invention; and FIG. 3 is a view of a modification of the present invention.

Referring now to the drawings, in FIG. 1, a borehole apparatus 10 is shown suspended by an armoured cable 11 in a borehole 12 which contains a usual conductive fluid 13. Cable 11 is spooled on a winch 14 at the surface to raise and lower the apparatus in a customary manner.

Apparatus 10 is significant only to the extent that upper and lower electrically conductive housings 15 and 16 (constructed for example, of steel) have mounted thereon electrodes 17, 18 which are cooperative to obtain an electrical measurement. To "break" the electrical path between the housings and electrodes, each housing is mechanically coupled to an intermediate insulating sub or housing 20 having means providing both a rigid mechanical connection between the housings and a discontinuity of an electrical path between the housings.

Referring now to FIG. 2, a more detailed illustration of the insulating sub is presented, the sub 20 having upper and lower metallic tubular sections 21, 22. Upper section 21 has a threaded box end 23 for receiving upper housing 15 (FIG. 1) and a lower end portion 24 which has a tapered surface 25 extending inwardly from its outer cylindrical surface 26 to the lower extremity of the section, say, for example, at 10° relative to the central axis of the section 21. The diameter of inner surface 30 of the upper section 21 is generally uniform from the box end 23 to the lower end portion 24 where a junction with a bore 31 of smaller diameter forms an upwardly-facing shoulder 32. An elongated, cylindrical and metallic insert member 33 is adapted to be loosely received within the upper section 21 and extend downwardly therefrom for mechanical coupling with the lower section 22. Thus, the bore 31 forms a hollow end portion while the insert 33 forms a plug in the hollow end portion.

In particular, the insert member 33 has different diametered portions including an upper head portion 34 of lesser diameter than the diameter of surface 30 of section 21, an intermediate portion 35 of lesser diameter than head portion 34 and having a threaded portion 36, and a lower portion 37 of lesser diameter than the intermediate portion 35. The downwardly-facing shoulder 38 formed between the head portion 34 and intermediate portion 35 overlaps the upwardly-faced shoulder 32 on upper section 21 as a mechanical safety precaution and is spaced therefrom by an annular rigid insulating ring 40 of suitable material, the insulating ring having comparable diameters to those of cylinder surface 30 and intermediate portion 35 thereby to center the insert member 33 relative to the upper section 21. Also, a cylindrical electrically insulating insert 32a is disposed between the head portion 34 and surface 30.

The diameter of intermediate portion 35 of the insert member 33 is less than the diameter of bore 31 of the upper section 21 to form an annular space 41 therebetween which is filled with a mechanical bonding and insulating agent 42. For reasons which will become apparent in the discussion to follow, the insert member 33 and lower portion 24 of section 21, respectively, have spaced annular grooves 43, 44 which alternate in positioning along the length of the annular space 41.

Insert member 33 is also provided with a plurality of identical, longitudinally-extending bores 46 which receive conductor rods 47 of smaller diameter. At the lower end of the insert member 33, the bores 46 are counterbored to receive suitable packing and insulating material 48 while the rods are threaded to receive banana plug sleeves 49. At the upper end of the insert member 33, the bores 46 are counterbored to receive insulating and sealing means 55 while the rods 47 are threaded to receive banana plugs 57.

The lower section 22 has an internally-threaded portion 60 for coupling with the threaded portion 36 of insert member 33, the threaded portion 60 adjoining an upwardly-facing shoulder 61 which is adapted to be spaced from the lower extremity of upper section 21. Shoulder 61 adjoins a tapered surface 62 which extends upwardly and outwardly from the shoulder 61 to an upper extremity of housing section 22. The tapered surface 62 of the lower section 22 is arranged relative to the tapered surface 25 of the upper section 21 so that the tapered surfaces are substantially parallel and spaced from one another. An insulating agent 63 separates the tapered portions 25, 62 from one another while an annular, rigid, insulating spacer member 64 received in the lower end of annular space 41 and having a portion underlapping the lower extremity of section 21 spaces the lower extremity of the upper section 21 from the shoulder 61 of the lower section 22 and also centers the lower extremity of the upper section 21 relative to the insert member 33. Spacer member 64 is also provided with longitudinal grooves (not shown) spaced about the periphery of the internal diameter surface for reasons which will become apparent in the discussion to follow.

The outer surface 65 of the lower housing section 22 is tapered inwardly and upwardly toward the upper extremity of lower section 22 so that a broad V-shaped recess is formed about the overlapped extremities of the housing section. Additional insulating materials 67, 68 are provided in layers in the V recess to build up insulation to the full diameter of surfaces 26, 65. Along substantially the entire length of the outer surfaces 26, 65 of the upper and lower sections 21, 22, a layer of insulating material 67 is also provided. Such a layer on the housing thus serves not only for electrical insulation but also reduces abrasion of the housing or sub.

The outer surface of lower section 22 has a portion 70 of reduced diameter which receives, for rotative movement thereon, a tubular, externally-threaded collar member 71, the collar member 71 being prevented from longitudinal movement by a split ring 72 and a snap ring 73 received in an annular recess 74 in section 22. Thus, the box end of housing 15 may be coupled to the lower section 22 by rotating the threaded collar 71 into the box end. A recess 75 below the collar receives an O ring to provide a fluid-tight connection between the lower section and a lower housing (not shown).

The following example of specific materials and details of assembling a practical embodiment of the present invention is provided in order that the invention will be more clearly understood but it should not be considered as limiting the invention in any sense.

In assembling the apparatus, the conducting rods 47 are secured to the insert member 33. The insert member 33 together with spacer 32a and spacer 40 in position are then inserted in upper section 21 so that insert 33 extends downwardly beyond section 21. Next, a suitable insulating agent 42 such as aluminum oxide with a grit size, for example, of 35-65 is packed in the annular space 41. While aluminum oxide is a preferable agent, in general, abrasive or granular grits which are electrically nonconductive such as silicates may be equally preferable. The lower spacer 64 is then set in place and the lower section 22 threaded up tight on insert 33. Aluminum oxide 63 is then packed in the annulus between the overlapped extremities of sections 21 and 22. A fiberglass packing 67 is then wrapped about the V-shaped groove and the entire assembly placed in a drying atmosphere to remove any moisture from the aluminum oxide and render it electrically nonconductive. The aluminum oxide is then impregnated with a binding agent such as an epoxy resin (for example, the epoxy resin manufactured by Shell Chemical Company and sold under the trademark "Epon"), the binding agent flowing through the fiberglass 67 into the tapered annulus and into the annulus 41 through the grooves in spacer 64 and also into the threads 36 and clearance between the lower section 22 and insert 33 to a point below the threads 36. The binding agent will thereafter harden to lock the two pieces together. Neoprene 68 is molded over the fiberglass impregnated area between the upper and lower sections 21, 22 to seal the spacing between the sections against a fluid leak, the neoprene filling the V-shaped groove to the diameter of surfaces 26, 65. Next, the outer surfaces 26, 65 and neoprene 68 are wrapped with fiberglass 67 which is also impregnated with the binding agent to insulate the length of the housing and provide a protective cover against abrasion. The entire assembly is then heated to cure the neoprene. The neoprene 68 in the V groove effectively prevents moisture from entering the aluminum oxide-epoxy filled annulus 41 and also serves to lengthen the electrical leakage path between the sections 21, 22.

In the above-described embodiment, the aluminum oxide crystals will have a random orientation in which some of the crystals will engage and overlap the grooves 43, 44 to provide an unexpectedly great amount of shear strength. Thus, the "bite" of the aluminum oxide crystals offers a mechanical resistance to shear. The tapered overlapping extremities also provides a certain amount of flexibility to bending moments which enhances the ruggedness of the tool.

In a modification of the present invention as shown in FIG. 3 an upper housing 77 is coupled to the insulating sub housing 20 and contains a half-shell support member 78 which spaces and supports electrical plugs 79 which are coupled by suitable means such as conductors 80 to the plugs 86 connected to insert member 33.

The entire length of the housing 77 and housing sub 20 except for a narrow width annulus 81 is electrically insulated by an insulating medium 82. Within the housing 77, a contact member 83 mounted on a nonconductive base 84 of the support member 78 is electrically coupled by a conductor 85 to an electrical connector 87 on the insert member 33. In this manner, the housing 77 and more particularly the annulus 81 of the housing serves as an electrode for electrical measurements. This eliminates the need of an idependently arranged electrode in the housing and greatly simplifies the construction of the tool.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

What is claimed is:

1. Exploratory apparatus for surveying well bores comprising: upper and lower electrically-conductive housings; means carried by said conductive housings for obtaining electrical measurements of the characteristics of earth formations; and an intermediate housing for electrically isolating and mechanically coupling said upper and lower housings including upper and lower tubular housing sections coupled at opposed extremities to said upper and lower housings and mechanically coupled at adjacent extremities to one another by an insulating medium, said adjacent extremities being tapered so that said sections overlap and a first annular space is formed therebetween, an insert member coupled to one of said housing sections and having portions extending into the other housing section, said extended portions being spaced relative to said other housing section to form a second annular space, said extended portions and said other housing section having annular recesses alternately spaced along said second annular space, and aluminum oxide impregnated with an epoxy resin binding agent received in said annular spaces mechanically bonding said housing sections to one another.

2. Exploratory apparatus for surveying well bores comprising: upper and lower electrically-conductive housings; means carried by said conductive housings for obtaining electrical measurements of the characteristics of earth formations; and an intermediate housing for electrically isolating and mechanically coupling said upper and lower housings including upper and lower tubular housing sections coupled at opposed extremities to said upper and lower housings and mechanically coupled at adjacent extremities to one another by an insulating medium, said adjacent extremities being tapered so that said sections overlap and a first annular space is formed therebetween, an insert member coupled to one of said housing sections and having portions extending into the other housing section, said extended portions being spaced relative to said other housing to form a second annular space, said extended portions and said other housing section having annular recesses alternatively spaced along said second annular space, current conducting means extending through said insert member and a binding and insulating medium comprising moisture-free, aluminum-oxide impregnated with a binding agent received in said annular spaces mechanically bonding said housing sections to one another.

3. Exploratory apparatus for surveying well bores comprising: upper and lower electrically-conductive housings; means carried by said conductive housings for obtaining electrical measurements of the characteristics of earth formations; and an intermediate housing for electrically isolating and mechanically coupling said upper and lower housings including upper and lower tubular housing sections coupled at opposed extremities to said upper and lower housings and mechanically coupled at adjacent extremities to one another by an insulating medium, said adjacent extremities being tapered so that said sections overlap and a first annular space is formed therebetween, an insert member coupled to one of said housing sections and having portions extending into the other housing section, said extended portions being spaced relative to said other housing to form a second annular space, said extended portions and said other housing section having annular recesses alternately spaced along said second annular space, binding and insulating medium comprising moisture-free, alminum-oxide impregnated with a binding agent received in said annular spaces mechanically bonding said housing sections to one another, and a moisture-proof fluid seal about the outer end of said first annular space.

4. A coupling for electrically insulating portions of a borehole apparatus from one another comprising: first and second tubular housings arranged in an end-to-end relationship, the adjacent ends of said housings having tapered portions arranged so that the extremities of the housings overlap and a first annular space is formed therebetween; an insert member coupled to one of said housings and having portions extending into the other housing, said extended portions being spaced relative to said other housing to form a second annular space; and moisture-free aluminum oxide received in said annular spaces mechanically bonding said housings to one another.

5. A coupling assembly for mechanically connecting while electrically isolating sections of borehole apparatus comprising: first and second elongated, longitudinally bored, metallic sections arranged in endwise relationship, said sections being adapted to be passed longitudinally through a borehole, and the opposed ends of said sections being adapted for connection to borehole apparatus; a metallic insert member coupled within the bore of said first metallic section and having a cylindrical portion extending into the bore of said second metallic section to form a thin, longitudinally extending, annular space therebetween, said cylindrical portion and the bore of said second metallic section having alternately spaced, annular recesses along said annular space; and grains of moisture-free aluminum oxide disposed in said annular space and impregnated with a plastic, electrically non-conductive, binding agent having a flow temperature higher than temperatures encountered in a borehole to form a shear-resistant mechanical bond between said sections.

6. A fluid-tight coupling assembly for mechanically connecting while electrically isolating sections of borehole apparatus comprising: first and second bored, metallic sections having adjacent, tapered, overlapping extremities forming a first annular space therebetween and having opposed extremities adapted to be connected to borehole apparatus housings; a metallic insert member within the bore of said first metallic section and coupled thereto and having a cylindrical portion extending into the bore of said second metallic section to form a second annular space therebetween, said cylindrical portion and the bore of said second metallic section having alternately spaced annular recesses along said second annular space; and aluminum oxide grains impregnated with a binding agent disposed in said annular spaces.

7. A fluid-tight coupling assembly for mechanically connecting while electrically isolating sections of borehole apparatus comprising: first and second bored, metallic sections having adjacent, tapered, overlapping extremities forming a first annular space therebetween and having opposed extremities adapted to be connected to borehole apparatus housings; a metallic insert member within the bore of said first metallic section and coupled thereto and having a cylindrical portion extending into the bore of said second metallic section to form a second annular space therebetween, said cylindrical portion and the bore of said second metallic section having alternately spaced annular recesses along said second annular space; and grains of moisture-free aluminum oxide disposed in said annular spaces and impregnated with a plastic, electrically non-conductive binding agent having a flow temperature higher than temperatures encountered in a borehole.

8. A fluid-tight coupling assembly for mechanically connecting while electrically isolating sections of borehole apparatus comprising: first and second elongated, longitudinally bored, metallic sections arranged in endwise relationship, said sections being adapted to be passed longitudinally through a borehole, the opposed ends of said sections being adapted for fluid-tight connection to borehole apparatus, and the adjacent ends of said sections having tapered, overlapping portions forming a first annular space therebetween; a metallic insert member within the bore of said first metallic section and coupled thereto and having a cylindrical portion extending into the bore of said second metallic section to form a thin, longitudinally extending, second annular space therebetween, said cylindrical portion and the bore of said second metallic section having alternately spaced, annular recesses along said second annular space; and grains of moisture-free aluminum oxide disposed in said annular spaces and impregnated with a plastic, electrically non-conductive binding agent having a flow temperature higher than temperatures encountered in a borehole to form a shear-resistant mechanical bond between said sections.

9. A fluid-tight coupling assembly for mechanically connecting sections of borehole apparatus comprising: first and second bored sections having adjacent, overlapping extremities forming a first annular space therebetween; a separate insert member within the bore of said first section with means on said insert member for coupling said insert member to said first section, said insert member having a portion extending into the bore of said second section to form a second annular space therebetween; a fluid-resistant binding agent disposed in said first and second annular spaces forming a high strength mechanical coupling with said sections and said insert member and overlapping shoulder means formed on said insert member and one of said bored sections.

10. A fluid-tight coupling assembly for mechanically connecting while electrically isolating sections of borehole apparatus comprising: first and second bored, metallic sections having adjacent, overlapping extremities forming a first annular space therebetween; a separate insert member within the bore of said first metallic section with means on said insert member for coupling said insert member to said first section, said insert member having a portion extending into the bore of said second metallic section to form a second annular space therebetween; a fluid-resistant, electrically insulating binding agent disposed in said first and second annular spaces forming a high strength mechanical coupling with said sections and said insert member and overlapping shoulder means formed on said insert member and one of said bored sections.

11. A coupling assembly for electrically insulating and mechanically coupling parts of a borehole apparatus to one another comprising: upper and lower elongated sections having portions at opposed extremities for coupling to said borehole apparatus; said sections having overlapping extremities sized to provide an elongated annular space therebetween; electrical isolation bonding means disposed in said space between said extremities, said bonding means having a flow temperature higher than temperatures encountered in a borehole and including moisture-free, electrically insulating metal particles providing a shear resistant mechanical bond between said sections, and radially projecting spaced-apart shoulder means formed on said overlapping extremities, said shoulder means having overlapping portions providing engagement surfaces between said sections thereby preventing separation of the lower section from the upper section should the bonding means between said sections fail.

12. The coupling assembly as set forth in claim 11 and further including electrical insulative seal means enclosing portions of said space which may be exposed to fluids for maintaining said bonding agent moisture free.

References Cited in the file of this patent
UNITED STATES PATENTS

| | | |
|---|---|---|
| 221,864 | Robbins | Nov. 18, 1879 |
| 1,726,014 | Carolan | Aug. 27, 1929 |
| 2,280,517 | Ridgway et al. | Apr. 21, 1942 |
| 2,569,390 | Sewell | Sept. 25, 1951 |
| 2,650,067 | Martin | Aug. 25, 1953 |
| 2,653,294 | McMillan | Sept. 22, 1953 |
| 2,779,915 | Moon | Jan. 29, 1957 |
| 2,802,896 | Tierman et al. | Aug. 13, 1957 |
| 2,938,708 | Arps | May 31, 1960 |
| 2,940,787 | Goodner | June 14, 1960 |
| 3,003,798 | Sandlin | Oct. 10, 1961 |
| 3,045,326 | Griffiths | July 24, 1962 |